United States Patent

Hirose

[11] 3,892,626
[45] July 1, 1975

[54] VENTED NUCLEAR FUEL ELEMENT
[75] Inventor: Yasuo Hirose, Hitachi, Japan
[73] Assignee: Hitachi, Ltd., Japan
[22] Filed: Dec. 14, 1971
[21] Appl. No.: 207,789

[30] Foreign Application Priority Data
Dec. 12, 1970 Japan.................... 45-111800
[52] U.S. Cl. ............ 176/68; 176/37; 176/79; 176/82
[51] Int. Cl. ............................. G21c 3/02
[58] Field of Search ............ 176/68, 79, 82, 19, 37, 176/80, 38

[56] References Cited
UNITED STATES PATENTS

| | | | |
|---|---|---|---|
| 3,350,271 | 10/1967 | Maidment et al. | 176/19 |
| 3,356,585 | 12/1967 | Zebroski | 176/68 |
| 3,459,636 | 8/1969 | Germer | 176/79 |
| 3,697,377 | 10/1972 | Gauthron | 176/79 |

Primary Examiner—Carl D. Quarforth
Assistant Examiner—Roger S. Gaither
Attorney, Agent, or Firm—Craig and Antonelli

[57] ABSTRACT

An improvement in a vented nuclear fuel element which, in operation of a nuclear reactor, discharges gaseous fission products generated in the fuel element into coolant, comprising a gas check valve including a gas permeable porous disk and such material that liquefies at operation temperature of a nuclear reactor, said porous disk and said material being disposed in combination in gas venting path, whereby in the operation the gaseous fission products being vented through said valve, and during shut down period of reactor said material solidifies to seal the fuel element from venting the gaseous fission products.

19 Claims, 3 Drawing Figures

VENTED NUCLEAR FUEL ELEMENT

BACKGROUND OF THE INVENTION

1. FIELD OF THE INVENTION

This invention relates to a vented nuclear fuel element and more particularly to a nuclear fuel element having a novel vent mechanism.

2. DESCRIPTION OF THE PRIOR ART

In recent years, nuclear reactors of extremely high degrees of burn-up, such as fast breeder reactors, have been developed. In these reactors, however, the higher the degree of burn-up of a fuel, the greater becomes the amount of gaseous fission products generated during burning. Consequently, the disposal of the gaseous fission products is a serious technical problem to be settled.

Conventionally, nuclear fuel is so designed that any increase in pressure in a fuel rod cladding tube due to accumulation of gaseous fission products can never produce stress exceeding the mechanical strength of the tube. For example, in boiling water reactors, a plenum space is provided at one end of a fuel rod for allowing the expansion of gaseous fission products, thereby preventing the pressure inside the tube from becoming too high. As the burn-up is increased, however, the plenum space required for the expansion of gaseous fission products also increases and thus influences the length of a fuel rod, and the length of a fuel assembly, hence the size of a reactor vessel, and thus the construction cost of a reactor. Further, there is the danger that gaseous fission products accumulated in a fuel element would burst out into coolant to cause cooling imperfection at the surface of fuel elements when the fuel element is ruptured.

From these reasons, vented fuel elements have been proposed in which gaseous fission products generated during buring are successively vented into coolant through the vent mechanism and not accumulated in the fuel elements.

In fuel elements of this type, usually, the discharge or vent of gas into a coolant is allowed but the back flow of the coolant into the fuel should not be allowed. The possibility of an occurrence of back flow arises when the reactor stops its operation, hence the fuel temperature decreases, thus the volume or the pressure of gas in the fuel decreases and the inner pressure of the fuel element may become lower than that of the coolant.

For preventing such a back flow, the following structures have been proposed:

1. one in which a storage tank is provided in the discharge path of gaseous fuel products, the volume of the tank being designed larger than the volume decrease of the gas in the fuel element occurring after stopping the operation of a reactor, thereby introducing the coolant into the storage tank but not to the fuel;

2. one in which porous material, which allows gas to permeate but not the coolant, is disposed in the discharge path of gaseous fission products to prevent the back flow of the coolant; and 3. one in which a mechanical check valve is provided in the discharge path.

According to structure (1), the system may be simple but the vent mechanism becomes large cancelling the original merit of shortening the fuel rods. Further, there is a possibility that highly radioactive gas is discharged in large amounts at the start up of the reactor after certain period of shut down. According to structure (2), the fuel rods can be much shortened, but there is a difficulty in selecting appropriate porous material which is impermeable to sodium which is unstable, has low surface tension and is used as coolant for fast breeder reactor. According to structure (3), the movable portion does not necessarily ensure steady and reliable performance.

SUMMARY OF THE INVENTION

An object of this invention is to provide a check valve structure to be used with a vented fuel element which eliminates the above-mentioned drawbacks.

Another object of this invention is to provide a check valve structure to be used in vented fuel element for preventing back flow, which can be easily manufactured.

A further object of this invention is to provide a fuel element which can perfectly seal the discharge path of the gaseous fission products when the element is brought outside a reactor.

According to the features and advantages of this invention, a check valve is disposed in the discharge path of gaseous fission products which are generated during operation and is to be discharged into coolant, the valve including material which is in the liquid state during operation and means for preventing this liquid material from moving into the inside of the fuel element.

BRIEF DESCRIPTION OF THE DRAWING

FIGS. 1 to 3 are longitudinal cross sections of embodiments of the vented fuel element according to this invention, in which:

FIG. 1 illustrates a fundamental structure,
FIG. 2 illustrates a modified structure in detail, and
FIG. 3 illustrates another structure.

DESCRIPTION OF THE PREFERRED EMBODIMENTS

Figure 1:
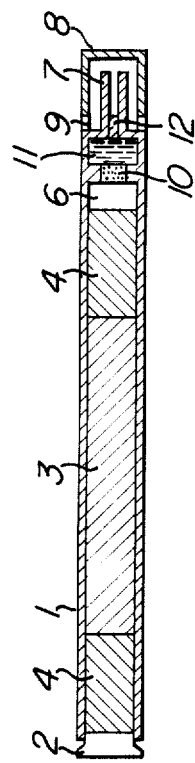

Referring to FIG. 1, a fuel element comprises a fuel 3 and a blanket 4, both contained in a cladding 1 the bottom end of which is sealed with a plug 2. Above the blanket 4, there is provided a plenum space 6 for absorbing the axial expansion of the fuel and gaseous fission products generated during operation are temporarily held in the plenum space 6. The gas is then discharged into the coolant through a gas check valve when it reaches a certain pressure.

The check valve comprises in combination porous plugs 10 and 12 and liquid state (in operation) inert material 11 and a capillary tube 7 working as a gas discharging aperture, separating the outside and the inside of the fuel element through the gas discharge openings 9 in the container cap 8. This valve or vent structure allows gas inside the element to discharge through the porous plugs 10 and 12 and the liquid material 11 when the inside of the element becomes of higher pressure than the outside. Further, even when the inside of the element becomes of lower pressure than the outside coolant, the gas in the discharging path is not allowed to flow back into the inside of the fuel element. Thus, in determining the length of the open capillary tube 7, it is sufficient only to consider the variation in the coolant pressure. The porous plug 10 makes contact only with an arbitrary chemically inert liquid material and not with the chemically active sodium (coolant), therefore the selection of the material for the porous plug 10 is easy. Further, since a liquid material which has a higher surface tension than that of liquid sodium working as a coolant can be selected, the mesh or size of the pores of the porous member can be selected larger to reduce clogging of the pores by fission products. Here, the existence of the porous plug 12 is not essential but effective when used with a material which is in the liquid phase even at room temperature.

Figure 2:
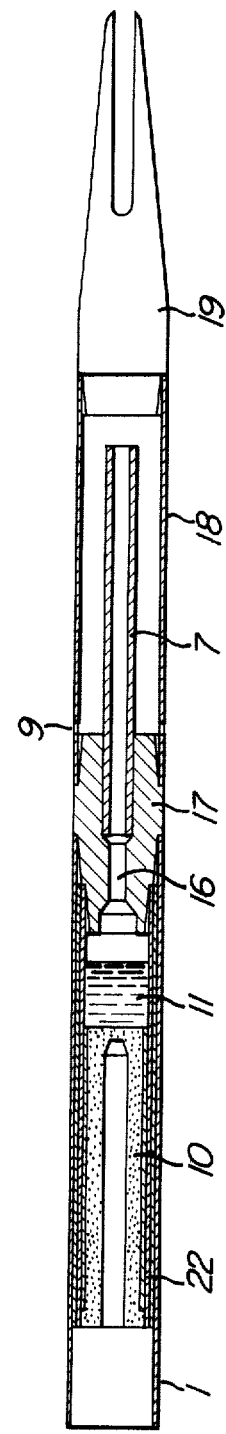

Now, a modified example of the fuel element according to this invention will be described referring to FIG. 2. A porous member 10 is held in a cladding 1 through a holder 22. The porous member 10 is formed of sintered powder of a substance identified as AISI 316. For preventing the clogging of pores by solid fission products such as cesium, iodine, molybdenum, etc., the porous member is shaped in single ended tubular form to increase the surface area. Above this porous member, a liquid phase member 11 comprising an alloy of lead and bismuth is disposed. The liquid phase member is initially heated to the melting point after the manufacture of a fuel rod and then solidified to seal the fuel hermetically. The top of the cladding tube 1 is fitted with an intermediate connector plug 17 having a communicating through hole 16 for the path of gaseous fission products. The path 16 is further extended upward by a capillary tube 7. Around the capillary tube 7 an upper tube 18 having discharge holes 9 in its lower part is disposed. Sealing the upper end of this upper tube 18 with an upper end plug 19, a gas storage vessel is formed within the tube 18 and the plug 19.

Figure 3:
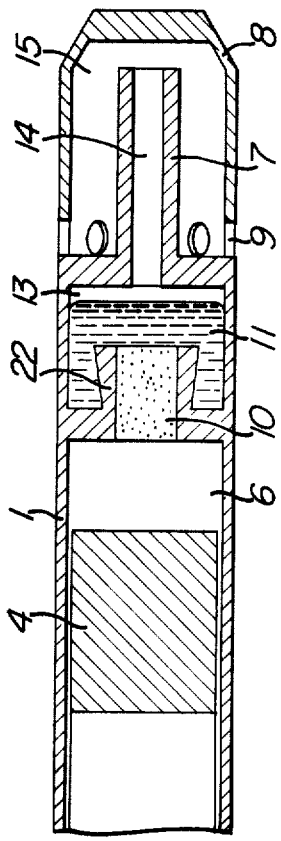

Another embodiment of the invention is shown in FIG. 3. Above a blanket fuel pellet 4, there is a plenum space 6 for absorbing the longitudinal expansion of the fuel. A cladding tube 1 and a vent structure are formed of stainless steel and assembled by welding. A porous member 10 is a sintered stainless steel disk having pores of average diameter of approximately $5\mu$ and is fitted in a holder 22 which in turn is fitted in the tube 1 and has an upward projection. The peripheral surface of the projecting portion of the holder 22 is finished smooth and reversely tapered, i.e., tapered toward the lower part. An alloy consisting of lead 44.5% and bismuth 55.5% is used as a liquid phase member 11. This alloy has a melting point of 124°C and thus becomes liquid in the sodium coolant but solidifies when taken out of a reactor. Further, this alloy performs volume shrinkage upon solidification and thus perfectly seals the exposed surface of the sintered stainless steel disk 10 by solidification and further engages with the reversely tapered surface of the holder 22 to seal the gas outlet, if any. The coefficients of thermal expansion of this alloy and the structural members, i.e., stainless steel, are of the same order and thus adhesion therebetween is perfect. The surface tension of this alloy at 300°C is about 400 dyn/cm being of the same order as mercury.

In the above fuel element, a molten alloy is poured into a predetermined place during the manufacturing process and then solidifies to achieve a perfectly hermetically sealed state. In addition, there is no danger of alpha-emitter leakage from such an element because when the fuel element is taken out of a reactor, the alloy solidifies to seal the element. Thus, transportation of such elements can be done more safely compared with that of the conventional vented fuel elements.

Further, in case removal of the sodium deposited on a fuel element is necessary before the transportation of the used fuel, the head portion of the fuel element can be cut off since the element is hermetically sealed with the alloy. Thus, the removal of the deposited sodium can be done extremely easily and clearly perfectly.

The above embodiments are described only for illustrative purpose and are in no way limitative, and the effect of this invention holds for any combination of the porous and the liquid materials. For example, as the porous material, metals, ceramics, sintered bodies, powder fillers, molecular sieves, etc., may be used. As the liquid phase material, any material which can physically and chemically cooperate with the porous member may be used, such as elements or alloys of mercury, bismuth, lead, tin, etc., or mixtures of salts of relatively low melting point.

Further, as the vent structure, any one which prevents the back flow of gas by a combination of a liquid state material and means for shutting off the liquid state material may be adopted, there, the liquid state material is different from the coolant to be used.

As has been described hereinbefore, according to this invention, there is provided a shortened vented fuel element which easily discharges the gaseous fission product generated during operation, prevents back flow of coolant at the time of starting and/or stopping operation, and perfectly hermetically seals the used fuel.

I claim:

1. A vented nuclear fuel element for nuclear reactors comprising a tubular cladding means for containing nuclear fuel and check valve means for venting gaseous fission products from said fuel to the exterior of the fuel element, said check valve means including porous means for passing gaseous fission products from the fuel, selective sealing means covering said porous means for passing said gaseous fission products passed from said porous means during operation of the fuel element and sealing said porous means during inoperation of said fuel element, and discharge means for discharging said gaseous fission products to the exterior of the fuel element, said selective sealing means being a material in a liquid state during operation of the fuel element and different from coolant surrounding the fuel element in the nuclear reactor.

2. A vented fuel element according to claim 1, wherein said porous means prevent said selective sealing means material in the liquid state from contacting said fuel.

3. A vented fuel element according to claim 1, wherein said material of said selective sealing means is chemically inert with respect to said porous means.

4. A vented fuel element according to claim 1, wherein during inoperation of the fuel element the material of the selective sealing means is in a solid state such that a solid seal is formed over the porous means.

5. A vented fuel element according to claim 1, wherein the material of the selective sealing means is an alloy of lead and bismuth.

6. A vented fuel element according to claim 5, wherein said alloy consists essentially of 44.5 per cent lead and 55.5 per cent bismuth.

7. A vented fuel element according to claim 1, wherein the material of said selective sealing means is selected from the group consisting of mercury, bismuth, lead, tin and alloys thereof.

8. A vented fuel element according to claim 1, wherein said discharge means includes a capillary tube having one end extending from the area of said selective sealing means, a container cap connected to said tubular cladding means for forming a chamber around said capillary tube, and gas discharge openings in side portions of said container cap for discharging gaseous fision products to the exterior of the fuel element, said gaseous fission products passing through said capillary tube from said area of said selective sealing means into said chamber.

9. A vented fuel element according to claim 8, wherein said tubular cladding means of the fuel element are disposed vertically such that said capillary tube extends upwardly, said container cap is connected at an upper end of said tubular cladding means, and said gas discharge openings in said container cap are located below an end of said capillary tube opposite to the end near the area of said selective sealing means.

10. A vented fuel element according to claim 9, wherein a second porous means is included in said capillary tube at said end near the area of said selective sealing means.

11. A vented fuel element according to claim 1, wherein said tubular cladding means of the fuel element is disposed vertically.

12. A vented fuel element according to claim 11, wherein said check valve means is disposed at an upper end of said tubular cladding means.

13. A vented fuel element according to claim 12, wherein said porous means is mounted in a holder means disposed between said fuel and the selective sealing means.

14. A vented fuel element according to claim 13, wherein said holder means projects upwardly into said material of said selective sealing means, said holder means having upwardly diverging peripheral sides, and wherein said material of said selective sealing means solidifies during inoperation of the fuel element such that the solidified material of the selective sealing means forms a solid seal around said holder means and porous means.

15. A vented fuel element according to claim 13, wherein said material of said selective sealing means contacts said holder means and said porous means.

16. A vented fuel element according to claim 1, wherein said material of said selective sealing means contacts said porous means.

17. A vented fuel element according to claim 1, wherein said porous member is tubular shaped having a closed end in contact with said material of said selective sealing means.

18. A vented fuel element according to claim 1, wherein the material of said selective means is in the liquid state when the fuel element is disposed in the nuclear reactor and in a solid state when the fuel element is disposed outside the nuclear reactor.

19. A vented fuel element according to claim 18, wherein said material is maintained in the liquid state in the nuclear reactor by heat from the coolant surrounding the fuel element.

* * * * *

UNITED STATES PATENT OFFICE
CERTIFICATE OF CORRECTION

Patent No. 3,892,626        Dated July 1, 1975

Inventor(s) Yasuo HIROSE

It is certified that error appears in the above-identified patent and that said Letters Patent are hereby corrected as shown below:

Title page as it reads now:

[30]    Foreign Application Priority Data

December 12, 1970    Japan.........45-111800

Title page as it should read:

[30]    Foreign Application Priority Data

December 16, 1970    Japan.........45-111800

Signed and Sealed this twenty-fifth Day of November 1975

[SEAL]

Attest:

RUTH C. MASON
*Attesting Officer*

C. MARSHALL DANN
*Commissioner of Patents and Trademarks*